United States Patent [19]

Bopst, III

[11] Patent Number: 4,546,667
[45] Date of Patent: Oct. 15, 1985

[54] ADJUSTABLE AND RELEASABLE ACCELERATOR PEDAL DEPRESSOR SYSTEM

[76] Inventor: John H. Bopst, III, 409 Chalfonte Dr., Baltimore, Md. 21228

[21] Appl. No.: 462,092

[22] Filed: Jan. 28, 1983

[51] Int. Cl.[4] .......................... G05G 1/04; G05G 1/14
[52] U.S. Cl. ......................................... 74/526; 74/513
[58] Field of Search ....................... 74/513, 514, 515 R, 74/515 E, 512, 541, 540, 503, 526; 180/170; 192/3 R, 3 H, 3 TR, 3 S, 3 T, 3 G, 3 M

[56] References Cited

U.S. PATENT DOCUMENTS

| | | | |
|---|---|---|---|
| 2,312,031 | 2/1943 | Coutcher | 74/513 |
| 2,662,622 | 12/1953 | Rodeback | 74/513 |
| 2,729,115 | 1/1956 | Reynolds et al. | 74/513 |
| 2,960,885 | 11/1960 | Donaldson | 74/513 |
| 3,000,475 | 9/1961 | Aprin | 74/513 |
| 3,081,837 | 3/1963 | Fiteny | 74/513 |
| 3,242,760 | 3/1966 | Keen et al. | 74/503 |
| 3,380,317 | 4/1968 | Liljequist | 74/513 |
| 3,543,601 | 12/1970 | Berger | 74/513 |
| 3,724,287 | 4/1973 | Dreeben | 74/513 |

Primary Examiner—Kenneth J. Dorner
Assistant Examiner—Vinh Luong
Attorney, Agent, or Firm—John F. McClellan, Sr.

[57] ABSTRACT

A simple and economical vehicle accelerator setting control system for motor vehicles having pivotal brake and accelerator pedals includes knob-controlled provision for setting an angled portion of an elongate speed control rod assembly in position for holding an accelerator pedal down in a manner releasable by hand on the knob or by foot preserve on the brake pedal; the speed control rod assembly has a bottom portion angled to swivel over the accelerator pedal and hold it down by means of a catch acting on a rack on the speed control rod assembly; to release engagement of the rack, the knob is rotated manually to present a smooth, non-engageable surface to the rack, and the same thing is done by foot pressure on the vehicle brake pedal, which causes an arm adjustably mounted to the brake pedal to swing against and rotate the angled portion free of the accelerator pedal.

3 Claims, 7 Drawing Figures

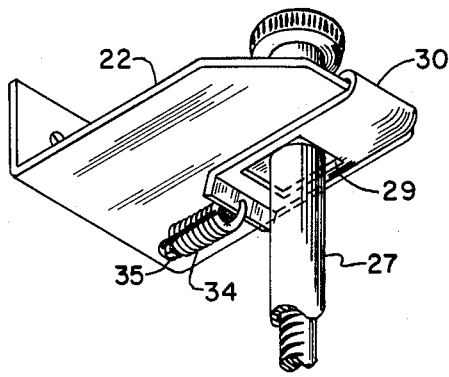
FIG.6
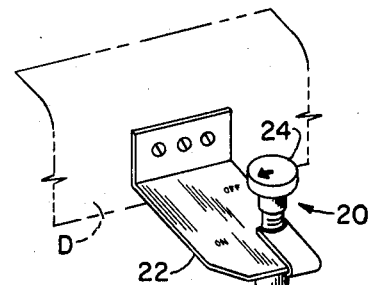
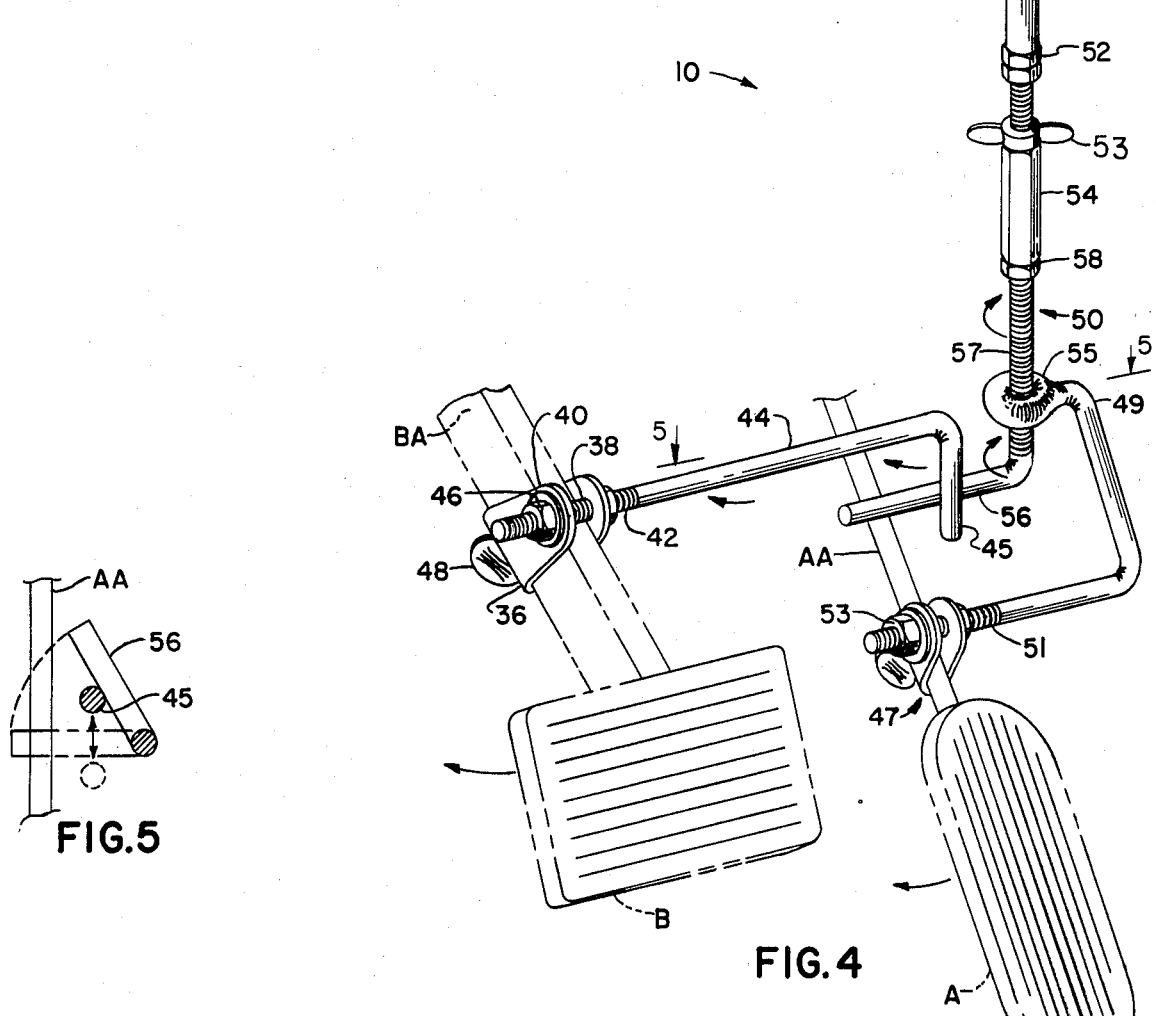
FIG.5
FIG.4

ADJUSTABLE AND RELEASABLE ACCELERATOR PEDAL DEPRESSOR SYSTEM

FIELD OF THE INVENTION

This invention relates generally to vehicles and particularly to an improved system of pre-settable speed or cruise control for constant terrain such as level ground.

BACKGROUND OF THE INVENTION

In the prior art various so-called "cruise-control" apparatus have been disclosed, utilizing various principles and of more or less complexity, examples being disclosed in these U.S. Patents:

No. 3,417,836 issued to R. H. Thornes on 12-24-68, showing an electro-mechanical apparatus for the purpose;

No. 3,104,741 issued to J. A. McDougal on 9-24-63, showing a vacuum-associated device for the purpose;

No. 1,218,028 to V. A. Williams, 3-6-17, showing rack and pawl apparatus with straight bar rack in one embodiment and segmental rack in another, and co-acting pawl mechanism controllable from the steering column.

SUMMARY OF THE INVENTION

The present invention has to do with a mechanical system that provides a positive and easy method for the operator to set and maintain a desired speed when driving an engine powered vehicle. The prime object is to provide a much more economical system and far less complicated than the devices presently available over level ground. The system is not intended to compensate for changing conditions such as uphill and downhill travel.

My invention provides an immediate on-or-off control of the desired engine speed. The "on" setting immediately locks the accelerator pedal arm to maintain the speed showing on the speedometer at the time of the setting. The "off" setting is immediately activated by either depressing the vehicle brake pedal or by turning the off control knob by hand.

Present devices available on the market are relatively more complicated, requiring electrical control boxes, magnetic bands, and considerable wiring, necessitating high costs to buy or repair. The average person cannot install or repair these devices. My system can be easily installed by the vehicle driver in many cases.

BRIEF DESCRIPTION OF THE DRAWINGS

The above will become more apparent from the following, including the figures, in which like parts are referred to by like reference numerals:

FIG. 4 is a view similar to FIG. 3 but looking in another direction;

FIG. 5 is an operational diagram adapted from 5—5, FIG. 4; and

FIG. 6 is a detail of the underside of the mechanism shown in FIG. 1.

DETAILED DESCRIPTION

Figure 1:
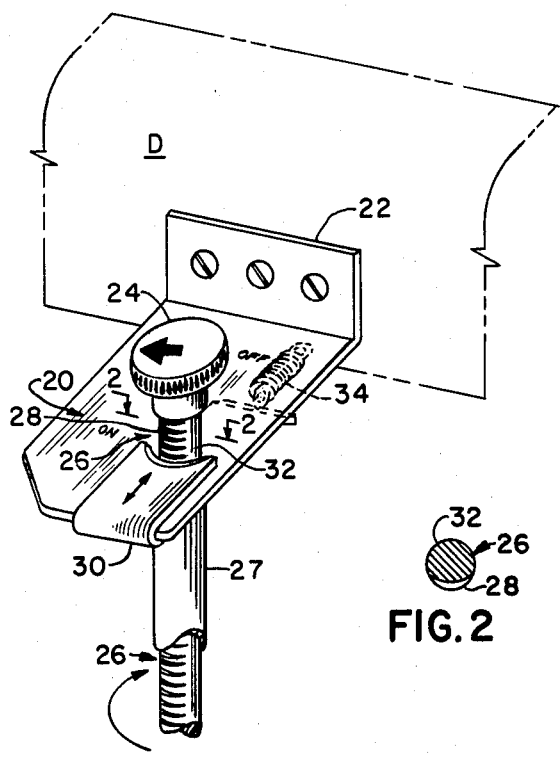
FIG. 1 is a fragmentary perspective detail of a control mechanism for the system of this invention.

FIG. 1 shows the setting control 20 for the invention. Bracket 22 holds this subassembly to the vehicle dashboard D.

Adjusting cruise speed requires at most at the knob 24 only a rotation of the knob, a depression of the knob, and a re-rotation of the knob, as follows.

The driver first depresses the vehicle accelerator pedal the distance necessary to adjust for the desired speed and then sets that speed adjustment using the knob 24 which is fixed to rack bar 26.

Knob 24 is first turned to "OFF" if not already there, freeing the notches 28 in rack 26 from catch plate 30 by rotating the smooth part 32 of the rack bar to face the catch plate.

The knob 24 is next depressed until it resists further depression, and then at that depression is turned to restore it to the rotational position at "ON" so that the sharp concave forward edge of the catch plate 30 engages the notches 28 and holds the selected depression of the knob, thus holding the speed setting.

A spring 34 holds the catch plate 30, which is slidable, (double headed arrow) and held against the rack bar 28 at all times, as will be seen in reference to a further detail later. Tubular member 27, welded or otherwise fixed to the bracket 22, serves to guide the rack bar 26.

Figure 2:
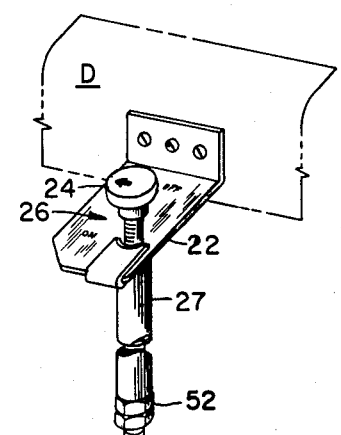
FIG. 2 is a sectional view taken at 2—2, FIG. 1.

FIG. 2 is a sectional view of the rack bar 26 showing that it may have a notched area 28 along one face and the remaining 250° to 260° smoothly rounded in section as at 32 to provide for engaging and disengaging the catch plate when rotated.

Figure 3:
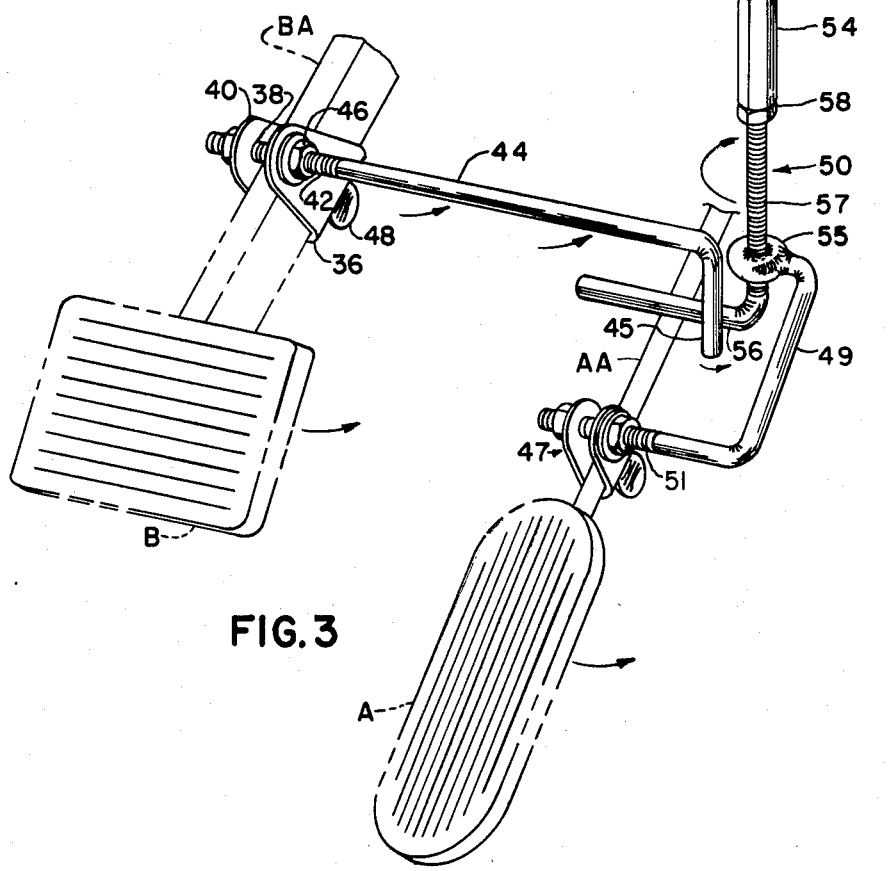
FIG. 3 is a perspective view of the system installed, with parts of a vehicle in which installed showing.

FIGS. 3 and 4 show the invention 10 as a whole, ready for use, attached to a typical swinging brake pedal B (pivoted at the upper end of brake pedal arm BA at a point not shown, motion indicated by the arrow) and to a typical swinging accelerator pedal A (similarly pivoted at the upper end of arm AA at a point not shown, motion indicated by the arrow) and to dashboard D.

The invention comprises only a few other elements, the principal being:

brake pedal arm clamp 36, a "U"-shaped member fitting the brake pedal arm BA; a respective clearance hole 38 in each leg 40 of the "U"-shape receives the straight, threaded shank 42 of "L"-shaped brake-attached disengaging-arm 44 which it retains in axially adjustable securance by a pair of nuts 46 with washers on the straight, threaded shank 42; a set-screw 48 threaded through the throat of the brake pedal arm clamp 36 permits adjustably fixing it anywhere along the typical rectangular-cross-section brake pedal arm BA; the tighter this set-screw 48 is set-up, the tighter the straight, threaded shank is pulled against and held to the brake pedal arm;

the "L"-shaped brake-attached disengaging-arm 44 (right-angle downturned portion 45) already referred to may be simply a length of circular-section metal rod long enough to extend from the securance at the brake pedal arm across the top of the accelerator pedal arm AA and then turn down at the shorter leg 45 of the "L"-shape in approximately a 90° angle;

accelerator pedal arm clamp 47 which may be similar to the brake pedal arm clamp 36 with a set or thumbscrew, for mounting the threaded shank of a threaded-eye arm 49 so that the threaded shank cannot swivel freely in the clamp;

the threaded-eye arm 49 has a threaded shank 51 engaging the holes in clamp 47 where nuts and washers 53 (FIG. 4) secure it and then curving in "J" shape to a threaded eye 55 (threads shown by broken lines); the threaded eye has threaded through it the threaded shank 57 of the "L" shaped lower terminus 45 of speed-control rod assembly 50. The extended distance of the threaded shank 57 can be lengthened or shortened by turning counterclockwise the coupler 54, and then held in place by tightening nut 58, or can be independently turned by itself relative to the coupler, for adjustment;

speed control rod assembly 50 terminates at the upper end in knob 24 which fastens to rack bar 26, which passes through tubular sleeve 27 affixed to bracket 22, and continues down as a fully threaded portion through thrust-motion-limiting jam nuts 52, and into length adjustment female threaded coupler 54. As indicated, from the lower end of the coupler 54 the angled or "L" shaped lower terminus 56 of speed control rod assembly 50 extends, fixed in adjustment by a jam nut 58 at the coupler 54. If desired, clamp 47 can be set to permit a degree of rotation of the rod. 53 is a coupler-jam nut.

OPERATION

When, as described in reference to FIG. 1, the driver depresses the accelerator pedal to the position producing the desired speed and depresses the knob 24 until resistance is felt, indicating the required adjustment, prior to twisting the knob and locking it in the first position or "ON" position at that level of depression, the resistance is caused by contact of the speed control rod assembly "L" shaped lower terminus 56 on the accelerator arm AA.

Either operation: turning the knob 24 to "OFF", or depressing the brake pedal, releases the cruise control pressure on the accelerator and de-activates the cruise-control, by similar action.

Both these operations cause the "L" shaped lower terminus 56 to rotate about the long axis of the speed control rod assembly, slipping the right-angle portion 56 off the accelerator arm AA, rotating assembly 50 and releasing the accelerator arm to be drawn upward by the customary accelerator spring.

Figure 4A:
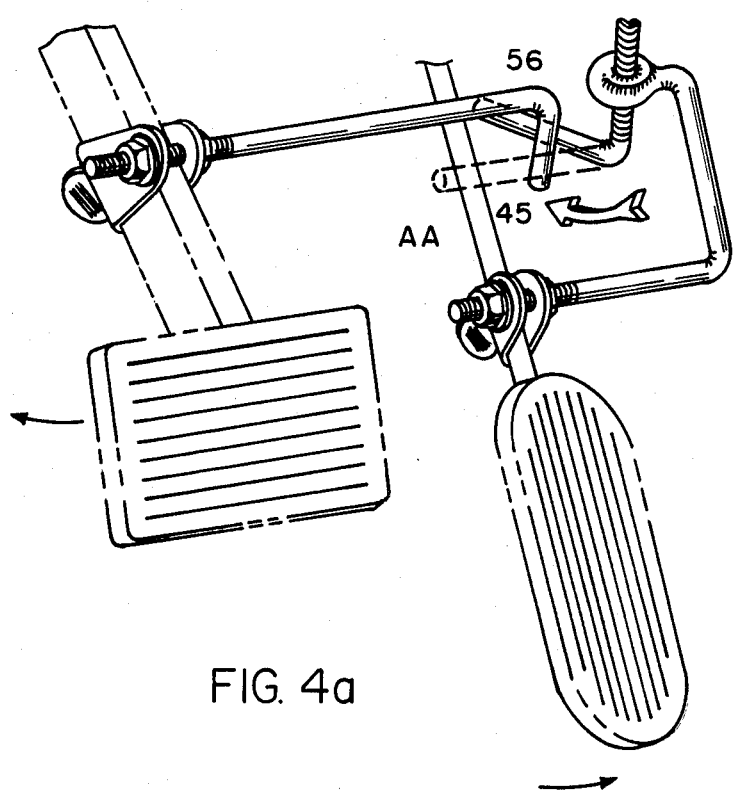
FIG. 4a is a fragmentary view like that of FIG. 4 but showing a further position of operation.

FIG. 4a shows how downward and forward movement (large arrow) of member 45 swings the member 56 clear of the accelerator pedal portion AA by means of the forward component of motion of member 45.

FIG. 5 diagrams the relations of the parts as depression of the brake pedal causes the downturned right angle position 45 of the brake pedal attached release arm to swing down and forwardly with the brake pedal, pivoting the right angle portion 56 of the lower terminus of the speed control rod assembly forwardly and to the side to a second position of rotation, freeing the accelerator arm to be restored by the spring customarily supplied for the purpose in vehicles.

FIG. 6 shows how the catchplate 30 has in side elevation a "U" shape enveloping the end of the bracket 22. The bottom of the catch plate is slotted and held by the tubular sleeve 27 or guide which passes through the slot 29 and secures, as by welding, to member 22. Tension spring 34 affixed to a post 35 and to the catch plate, maintains contact of the edged end of catch plate 30 with the member 26.

From the above it will be appreciated that the system has many adjustments, to fit it for installation in many sizes, makes, and types of vehicles that have upwardly biased, pivotally mounted accelerator pedals, that it can be readily installed by any driver with average mechanical skill, that it is economical in having few and simple parts and parts that can be simply made, without need for close tolerances. For example, the threaded eye can be of customary eyebolt construction, made of round stock so that the tapped hole in the eye contacts only one or two threads of the engaging shank and gives a degree of non-jamming self-alignment, while permitting the speed control rod assembly to rotate, for height adjustment or for operation, in either direction, but constraining it axially.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system for use with a depressable brake pedal part and having means for holding an upwardly-biased pivotally mounted vehicle accelerator pedal part at a selected position of depression, and further having means for releasing a said accelerator pedal part from the means for holding, the improvement comprising: said means for holding including: a bracket for attachment to a vehicle, a speed control rod assembly, said speed control rod assembly being rotatable in said bracket from a first position of rotation to a second position of rotation, means permitting adjustable depression of said speed control rod assembly to a downward position for pressing down a portion thereof on a said accelerator pedal part, manual means for affixing said speed control rod assembly in said downward position by rotation of said speed control rod assembly to said first position of rotation, said means permitting adjustable depression permitting manual releasing of said speed control rod assembly from said downward position by rotation of said speed control rod assembly to said second position of rotation, further means for releasing said speed control rod assembly from said downward position by pedal depression of a said depressable brake pedal part, said speed control rod assembly being generally elongate with a rack portion along an upper part thereof, a catch on said bracket, said means for affixing said speed control rod assembly in downward position including means biasing said catch into engagement with said speed control rod assembly at said rack portion in said first position of rotation of said speed control rod assembly, said means permitting adjustable depression including a smooth portion of said speed control rod assembly for preventing said catch from engaging said speed control rod assembly in said second position of rotation permitting adjustable depression including said portion of the speed control rod assembly being an angled arm on the lower end of said speed control rod assembly in position for crossing over a said accelerator pedal part and for pressing down thereon when the speed control rod assembly is in said first position of rotation, and said further means for releasing said speed control rod assembly including a horizontal rod with a downward end, means for adjustably clamping the horizontal rod to a brake pedal part with the downward end in position for rotating said angled arm to said second position for rotation upon said pedal depression of said depressable brake part.

2. In a system for use with a depressable brake pedal part and having means for holding an upwardly-biased pivotally mounted vehicle accelerator pedal part at a selected position of depression, and further having means for releasing a said accelerator pedal part from the means for holding, the improvement comprising: said means for holding including: a bracket for attachment to a vehicle, a speed control rod assembly, said speed control rod assembly being rotatable in said bracket from a first position of rotation to a second position of rotation, means permitting adjustable depression of said speed control rod assembly to a downward position for pressing down by a portion thereof on a said accelerator pedal part, manual means for affixing said speed control rod assembly in said downward position by rotation of said speed control rod assembly to said first position of rotation, said means permitting adjustable depression permitting manual releasing of said speed control rod assembly from said downward position by rotation of said speed control rod assembly to said second position of rotation, further means for releasing said speed control rod assembly from said downward position by pedal depression of a said depressable brake pedal part, said speed control rod assembly being generally elongate with a rack portion along an upper part thereof, a catch on said bracket, said means for affixing said speed control rod assembly in downward position including means biasing said catch into engagement with said speed control rod assembly at said rack portion in said first position of rotation of said speed control rod assembly, said means permitting adjustable depression including a smooth portion of said speed control rod assembly for preventing said catch from engaging said speed control rod assembly in said second position of rotation, said means permitting adjustable depression including said portion of the speed control rod assembly being an angled arm on the lower end of said speed control rod assembly in position for crossing over a said accelerator pedal part and for pressing down thereon when the speed control rod assembly is in said first position of rotation, said further means for releasing said speed control rod assembly including a horizontal rod with a downward end, means for adjustably clamping the horizontal rod to a brake pedal part with the downward end in position for rotating said angled arm to said second position of rotation upon said pedal depression of said depressable brake part, means for adjustably supporting said speed control rod assembly including a threaded shank portion above the angled arm, means for adjustably supporting said speed control rod assembly adjacent said angled arm including a threaded eye engaging said threaded shank portion, and means for adjustably attaching said threaded eye to a said accelerator pedal part.

3. In a system for use with a depressable brake pedal part and having means for holding an upwardly-biased pivotally mounted vehicle accelerator pedal part at a selected position of depression, and further having means for releasing a said accelerator pedal part from the means for holding, the improvement comprising: said means for holding including: a bracket for attachment to a vehicle, a speed control rod assembly, said speed control rod assembly being rotatable in said bracket from a first position of rotation to a second position of rotation, means permitting adjustable depression of said speed control rod assembly to a downward position for pressing down by a portion thereof on a said accelerator pedal part, manual means for affixing said speed control rod assembly in said downward position by rotation of said speed control rod assembly to said first position of rotation, said means permitting adjustable depression permitting manual releasing of said speed control rod assembly from said downward position by rotation of said speed control rod assembly to said second position of rotation, further means for releasing said speed control rod assembly from said downward position by pedal depression of a said depressable brake pedal part, said speed control rod assembly being generally elongate with a rack portion along an upper part thereof, a catch on said bracket, said means for affixing said speed control rod assembly in downward position including means biasing said catch into engagement with said speed control rod assembly at said rack portion in said first position of rotation of said speed control rod assembly, said means permitting adjustable depression including a smooth portion of said speed control rod assembly for preventing said catch from engaging said speed control rod assembly in said second position of rotation, said means permitting adjustable depression including said portion of the speed control rod assembly being an angled arm on the lower end of said speed control rod assembly in position for crossing over a said accelerator pedal part and for pressing down thereon when the speed control rod assembly is in said first position of rotation, said further means for releasing said speed control rod assembly including a horizontal rod with a downward end, means for adjustably clamping the horizontal rod to a brake pedal part with the downward end in position for rotating said angled arm to said second position of rotation upon said pedal depression of said depressable brake part, means for adjusting the length of the speed control rod assembly including a threaded shank portion, a threaded tubular member engaging the threaded shank portion, and a nut for fixing the position of the threaded tubular member relative to the threaded shank portion.

* * * * *